(12) United States Patent
Tan et al.

(10) Patent No.: US 12,719,977 B2
(45) Date of Patent: Aug. 25, 2026

(54) SYSTEM AND METHOD FOR WIRELESS AUDIO CONNECTIVITY DETECTION AND ROUTING OF AN INCOMING CALL

(71) Applicant: MOTOROLA SOLUTIONS, INC., Chicago, IL (US)

(72) Inventors: Cheah Heng Tan, Bayan Lepas (MY); Lee Sun Ooi, Kulim (MY); Liong Siung Wong, Bayan Lepas (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 311 days.

(21) Appl. No.: 18/442,165

(22) Filed: Feb. 15, 2024

(65) Prior Publication Data

US 2025/0267208 A1 Aug. 21, 2025

(51) Int. Cl.
*H04M 1/60* (2006.01)
*G06F 3/16* (2006.01)
(Continued)

(52) U.S. Cl.
CPC .......... *H04M 1/6075* (2013.01); *G06F 3/165* (2013.01); *G10L 19/018* (2013.01); (Continued)

(58) Field of Classification Search
CPC ......... H04W 4/80; H04W 76/14; H04W 4/40; H04W 8/005; H04W 4/029; H04W 4/48; H04W 88/06; H04W 84/12; H04W 84/18; H04W 48/04; H04W 4/027; H04W 4/70; H04W 4/60; H04W 4/90; H04W 4/021; H04W 4/33; H04W 4/42; H04W 76/50; H04W 4/14; H04W 4/02; H04M 1/72412; H04M 1/0264; H04M 1/6091; H04M 1/72463; H04M 1/0266; H04M 1/72454; H04M 1/6066; H04M 2250/74; H04M 2250/02; H04M 1/72457; H04M 1/724098; H04M 3/568; H04M 11/04; H04M 2250/12; H04M 3/42382; H04M 3/5116; H04R 2420/07; H04R 2499/13; H04R 3/005; H04R 3/12; H04R 2420/01; H04R 2499/11; H04R 5/04; H04R 2420/00;
(Continued)

(56) References Cited

U.S. PATENT DOCUMENTS 8,705,722 B2 * 4/2014 Boni ...................... H04M 3/54
379/212.01
9,451,406 B2 9/2016 Cornaby et al.
(Continued)

FOREIGN PATENT DOCUMENTS

JP 2009545017 A 12/2009
WO 2022105339 A1 5/2022

*Primary Examiner* — Golam Sorowar
(74) *Attorney, Agent, or Firm* — Barbara R Doutre

(57) ABSTRACT

Embodiments provide for a system and method that address challenges associated with audio routing of an incoming call between two devices operatively coupled via a short-range wireless connection. Ultrasonic watermark signals are generated and sent between the two devices. Detection and non-detection of the ultrasonic watermark signals controls the audio routing. The ultrasonic watermark signals can be modified based on a predetermined operational characteristic known only to the two devices for increased robustness to the system.

20 Claims, 4 Drawing Sheets

(51) Int. Cl.

| | |
|---|---|
| ***G10L 19/018*** | (2013.01) |
| ***H04M 1/72412*** | (2021.01) |
| ***H04M 1/72469*** | (2021.01) |
| ***H04R 3/00*** | (2006.01) |
| ***H04R 3/12*** | (2006.01) |

(52) U.S. Cl.
CPC ... *H04M 1/72412* (2021.01); *H04M 1/72469* (2021.01); *H04R 3/005* (2013.01); *H04R 3/12* (2013.01); *H04R 2420/07* (2013.01); *H04R 2499/13* (2013.01)

(58) Field of Classification Search
CPC ........ H04R 29/004; H04R 3/00; H04R 1/406; H04R 3/04; H04R 1/1083; H04R 1/08; H04R 1/10; H04R 1/1016; H04R 1/1041; H04R 1/1091; H04R 2201/107; G06F 3/165; G06F 3/017; G06F 3/167; G06F 16/44; G06F 3/048; G06F 3/0484; G06F 3/011; G06F 9/546; G06F 3/0481; G06F 9/542; G06F 3/16; G06F 3/0227; G06F 3/04842; G06F 3/162; G06F 21/00; G06F 13/102; G06F 16/25; G06F 16/583; G06F 16/951; G06F 2218/10
See application file for complete search history.

(56) References Cited

U.S. PATENT DOCUMENTS

| | | | | |
|---|---|---|---|---|
| 9,667,284 | B1 | 5/2017 | Gean et al. | |
| 9,730,255 | B1 * | 8/2017 | Chu | H04L 65/1093 |
| 10,284,728 | B1 | 5/2019 | Gean et al. | |
| 10,587,408 | B2 | 3/2020 | Ooi | |
| 10,671,341 | B1 | 6/2020 | Gean et al. | |
| 11,362,746 | B2 | 6/2022 | Nehls et al. | |
| 11,630,636 | B2 * | 4/2023 | Watson | G06F 3/165 381/74 |
| 11,988,784 | B2 * | 5/2024 | Jones | G01S 7/539 |
| 2013/0157631 | A1 * | 6/2013 | Wang | G06F 3/04842 455/414.1 |
| 2016/0028356 | A1 * | 1/2016 | Eltoft | H04R 1/1041 381/105 |
| 2016/0277925 | A1 * | 9/2016 | Bengtsson | G06F 21/35 |
| 2021/0294565 | A1 * | 9/2021 | Watson | H04R 1/1041 |
| 2023/0337302 | A1 * | 10/2023 | Kim | H04W 8/005 |

* cited by examiner

SYSTEM AND METHOD FOR WIRELESS AUDIO CONNECTIVITY DETECTION AND ROUTING OF AN INCOMING CALL

BACKGROUND

Audio routing issues often arise between wirelessly paired devices that physically separate but remain connected via a wireless connection. Currently, for example, a driver's portable communication device wirelessly couples to a vehicular audio system upon entering the vehicle. The wireless connectivity is achieved via a short-range wireless communications link, such as a Bluetooth®, Wi-Fi, or other wireless local-area network (WLAN) link, between the vehicular audio system and the communication device. Once the vehicle's audio system is enabled and the portable communication device is within a connectivity range of the system, the wireless connection is typically made automatically. However, a problem with missing audio often arises when the driver exits the vehicle with the portable communication device, as the device remains connected to the vehicular system. In some cases, an incoming call may be answered within the vehicle, but the exiting driver is unable to hear or speak to the caller, as the audio connectivity remains routed to the vehicular system. To mitigate this problem, drivers need to take extra steps to manually disconnect the short-range communications link each time the failed audio occurs. While the audio connectivity problem is encountered by many users, it is particularly troublesome for critical communication users where response time is of the utmost importance.

Short-range wireless connectivity issues may also arise between other wirelessly paired devices, where audio remains routed to a device that has been left behind by a user. For example, wirelessly paired portable radio/remote speaker microphone (RSM), tablet/headset, and laptop/headset may all encounter audio routing issues when devices begin to separate but remain wirelessly paired.

Accordingly, there is a need for improved detection of audio connectivity in communication systems having wirelessly connected devices. Improved detection would be beneficial to the routing of an incoming call in the systems described above.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
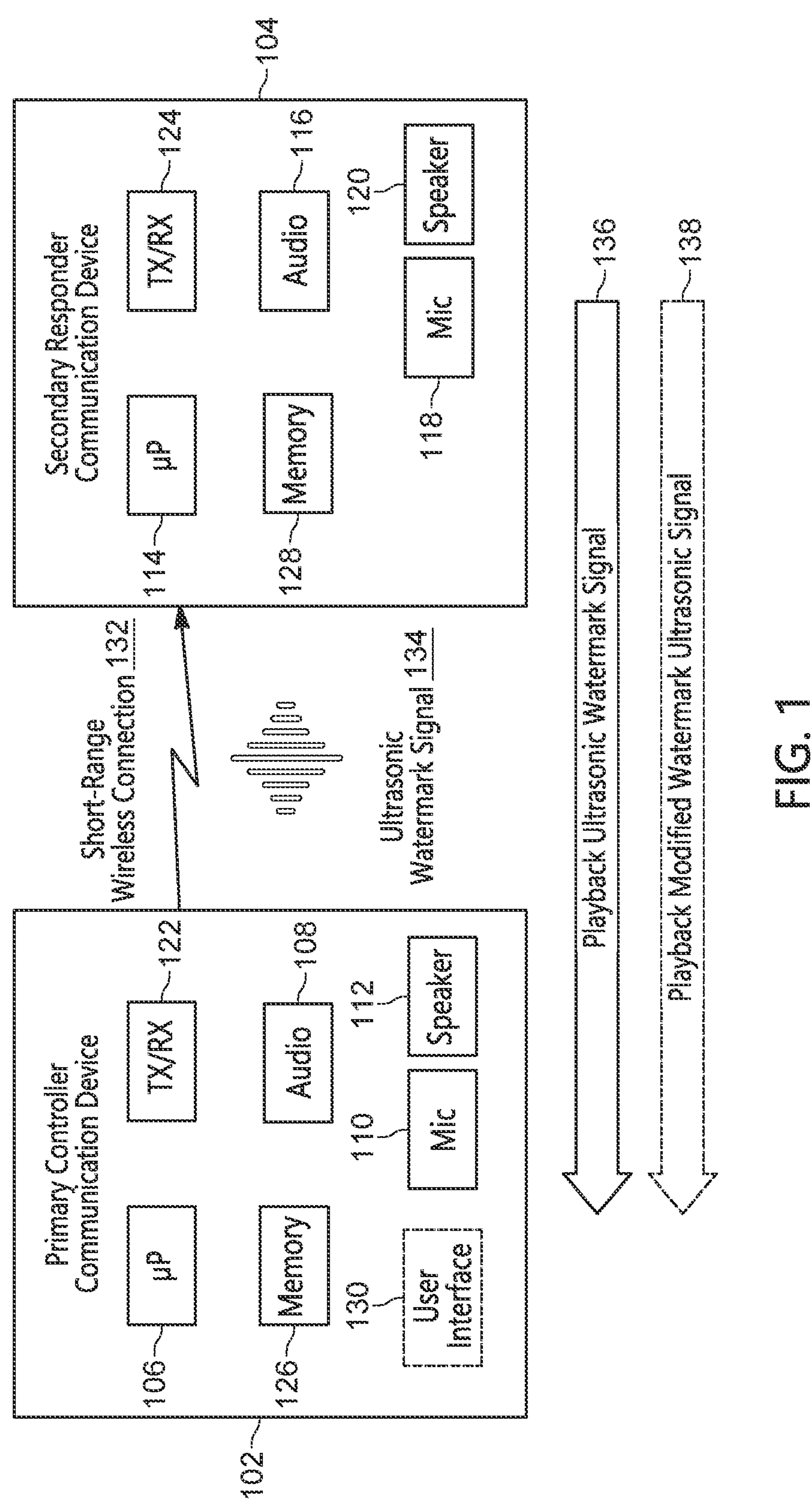
FIG. 1 is a block diagram of a communication system formed and operating in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

Briefly, the embodiments provide for a system and method that address the previously described challenges associated with audio routing of an incoming call between two devices operatively coupled via a short-range wireless connection. The communication system comprises a primary communication device operating as a controller device (also referred to as primary controller communication device, primary device or master device) and a secondary communication device operating as a responding device (referred to as a secondary responder communication device, secondary device, or slave device). Examples include, but are not limited to, a portable radio operating as the primary controller communication device and a vehicular radio operating as the secondary responder communication device; a portable radio operating as the primary controller communication device and a wireless remote speaker microphone (RSM) operating as the secondary responder communication device; or vice versa with the RSM operating as the primary controller communication device and the portable radio operating as the secondary responder communication device. The embodiments may also be beneficially applied to other combinations of paired devices having audio capability, such as smartphone/headset, mobile phone/tablet, and headset/laptop, to name a few.

The system and method of the embodiments are directed towards controlling the routing of an incoming call based on the detection or non-detection of an ultrasonic watermark signal. The embodiments include establishing a short-range wireless connection between the primary controller communication device (primary device) and secondary responder communication device (secondary device), sending an ultrasonic watermark signal, over the short-range wireless connection, from the primary device to the secondary device; and receiving and playing back the ultrasonic watermark signal over a secondary speaker of the secondary device. The primary device then detects the playback of the ultrasonic watermark signal at a primary device microphone and, in response thereto, routes an incoming audio call, over the short-range wireless connection, to playout at a secondary speaker of the secondary device. The ultrasonic watermark signal may be sent independently of the call or embedded within the call. When the playback of the ultrasonic watermark signal is no longer detected by the primary device microphone, the primary device automatically re-routes the incoming call for playout at the primary speaker.

In some embodiments, the system and method may automatically re-route the incoming call back to the secondary responding communication device, in response to re-detecting the playback of the ultrasonic watermark signal by the microphone of the primary communication device. For example, re-entry of a portable radio to a vehicle, where the microphone of the portable radio redetects the ultrasonic watermark signal being played out by the vehicular radio.

In some embodiments, the ultrasonic watermark signal sent by the primary controlling communication device may be modified by the secondary responding communication device, prior to playback, based on a predetermined operational characteristic known only to both the primary and secondary devices. For example, modifications to the ultrasonic watermark signal may be based on a communication connectivity characteristic, such as elapsed connectivity time (time-lapse), combination of mac-addresses of both primary and secondary devices, or combination of device IDs of the primary and secondary devices, or other operational characteristic known only to the two devices. The modification may be achieved using, for example, a frequency variation of the original (parent) watermark signal.

In some embodiments, the primary device is configured to detect the playback of modified ultrasonic watermark signal, and compare the playback of the modified signal to known acceptable variations stored in a memory of the primary device. Modifying the ultrasonic watermark signal based on the predetermined operational characteristic, known to both the primary and secondary devices, prior to playback provides additional security by minimizing the ability of _devices external to the system from copying the watermark in an attempt to gain access to an incoming call (e.g. to eavesdrop on the call and/or sabotage the call).

In some embodiments, a user interface (UI) selectable call option may be presented, such as on a user selectable display on the primary device, to re-route the incoming call, from the primary device back to the secondary device. This UI option may be presented during the automatic re-routing and playout of the incoming call at the speaker of the primary communication device, while the watermark is not being detected. The UI interface advantageously allows the user to override the automated re-routing of a call, if desired.

Further advantages and features consistent with this disclosure will be set forth in the following detailed description, with reference to the figures.

FIG. 1 is a block diagram of a communication system 100 formed and operating in accordance with some embodiments. Communication system 100 includes first and second communication devices, referred to as a primary controller communication device 102 and a secondary responder communication device 104. The primary controller communication device 102 comprises a primary processor 106, a primary audio system 108, a primary microphone 110, and a primary speaker 112. The secondary responder communication device 104 comprises a secondary processor 114, a secondary audio system 116, a secondary microphone 118, and a secondary speaker 120. Each of the primary and secondary devices 102, 104 respectively comprises transceiver elements 122, 124 for transmitting and receiving radio frequency (RF) signals. The two devices 102, 104 may operate independently within a public safety network, such as a land mobile radio (LMR) communications network, or other public safety network. When wireless pairing is established via a short-range wireless communication, the two devices 102, 104 are configured as controller device (sometimes referred to as master device) and responder device (sometimes referred to as slave device) to detect an incoming call and manage audio routing of the incoming call in accordance with the embodiments described herein.

Primary controller communication device 102 and secondary responder communication device 104 may be paired using short-range wireless connectivity, such as BLUETOOTH (BT), NFC, WI-FI, ZIGBEE, or other short-range wireless connection. Primary device 102 and secondary device 104 may further respectively comprise a primary memory 126 and a secondary memory 128 storing software instructions and data associated with a predetermined operational characteristic associated with the paired devices. In some embodiments, the primary controller communication device 102 may further comprise a user interface 130, such as a display for presenting user selection options to a user.

In accordance with some embodiments, the primary processor 106 is configured to establish a short-range wireless connection 132 with the secondary processor 114 using a standard short-range wireless profile, and send an ultrasonic watermark signal 134, over the short-range wireless connection, from the primary audio system 108 to the secondary audio system 116. The secondary processor 114 is configured to receive the ultrasonic watermark signal 134 at the secondary audio system 116, and playback the ultrasonic watermark signal 136 over the secondary speaker 120.

For the purposes of this application the ultrasonic signal 134 is an acoustic sound pressure wave with a frequency greater than the upper limit of the human hearing range, for example 17 kHz up to several hundred kilohertz. Hence, the ultrasonic signal is not heard by the user of the two devices 102, 104. The ultrasonic watermark signal 134 may be embedded within an audio call or sent (transmitted) independently of the audio call, over the short-range connection 132 for processing by the secondary processor 114.

In accordance with some embodiments, the primary processor 106 is further configured to: detect the playback of the ultrasonic watermark signal 136 at the primary microphone 110, and, in response thereto, route an incoming audio call, over the short-range wireless connection 132, to playout at the secondary speaker 120 of the secondary responder communication device 104. Playback of the ultrasonic watermark signal 136 may also be referred to as playback of the original (non-modified) watermark signal.

In accordance with some embodiments, the primary processor 106 may further be configured to monitor or scan for continued detection, or periodic detection, of the playback of the ultrasonic watermark signal 136 at the primary microphone 110 to maintain routing of the incoming call to the secondary speaker 120 of the secondary responder communication device 104.

The primary processor 106 may be further configured to automatically re-route the incoming call for playout at the primary speaker 112 in response to the playback of the ultrasonic watermark signal 136 not being detected by the primary microphone 110, while the short-range wireless connection is maintained. Hence, detection and non-detection of the playback of the ultrasonic watermark signal 136 controls the routing of the incoming audio call.

The automatic re-route of the incoming call to the primary speaker 112 is enabled based on a non-standard short-range wireless profile associated with the primary controller communication device 102. The non-standard short-range wireless profile controls re-route of the incoming call to the primary controller device, while the short-range wireless connection to the secondary responder device 104 remains connected. This situation may occur, for example, when the primary controller communication device 102, such as a portable radio, moves away from the secondary responder communication device 104, such as a vehicle radio, wherein the short-range wireless connection is still present but the watermark has ceased being detected by the primary microphone 110.

Maintaining the short-range wireless connection (maintained based on distance between devices) advantageously allows for a quick reconnect of the incoming call back to the secondary speaker 120 in response to re-detection by the primary microphone 110 of the played back ultrasonic watermark signal 136. The system configures the ultrasonic watermark signal, via processors 106, 108, to be detectable within a predetermined watermark detection range (distance) between the two devices 102, 104, wherein the predetermined watermark detection range is smaller than the short-range connectivity range. The watermark detection range may be configured via adjustment of amplitude and phase of the ultrasonic frequencies. The watermark detection range may be configured, for example, based on the distance between two wirelessly paired devices that operate within a vehicular environment. For example, a BT short-range connection may have a range of 100 meters, while the watermark detection range may be configured for 1.5 meters (distance indicative of in-vehicle operation). In the portable radio/vehicular radio environment example, an incoming call will automatically be re-routed back to the vehicular radio speaker, upon re-entry of the portable radio back into the vehicle based on re-detection of the played back ultrasonic watermark signal. As another example, the watermark detection range may be configured based on the distance between the two wirelessly paired devices typically worn on the body. For example, the watermark detection range may be configured for 0.5 meters for a portable radio (operating as primary controlling device worn at the user's waist) and RSM (operating as secondary responder device worn at the user's shoulder). For the portable radio/RSM environment, if the portable radio worn by the user moves away from the RSM (e.g. RSM removed or left behind), the watermark detection by the portable radio will go out of range, and the incoming call will transfer to the portable radio speaker. When the portable radio moves back within watermark detection range, the call will automatically re-route back to the RSM speaker.

Variations to phase and amplitude of the ultrasonic watermark frequencies allow for an adjustable ultrasonic watermark detection range that is configurable for the desired usage environment. For a fixed phase, the higher the amplitude, the larger the distance that can be implemented, and the smaller the amplitude, the shorter the distance that can be implemented. When both the phase and amplitude are adjusted, then additional range options can be achieved. Phase adjustment can be used to fine tune the watermark detection range for a plurality of possible locations of the primary device, for faster and more efficient reconnection time. Dynamic adjustment to the ultrasonic watermark detection range can also be made based on learned usage patterns and contextual environment. For example, different ultrasonic signal ranges can be used for a portable radio wirelessly paired to a vehicular radio and that same portable radio being wirelessly paired to an RSM.

In accordance with some embodiments, the ultrasonic watermark signal may be modified by the secondary responder device 104 and played back as modified ultrasonic watermark signal (also referred to as child watermark signal). The modification of the original (or parent) watermark signal 136 may be based on a predetermined operational characteristic of the short-range wireless connection, prior to playback over the secondary speaker 120 for detection by the primary microphone 110. The predetermined operational characteristic is preferably a characteristic known only by the two devices 102, 104, such as connection lapse time, combination of mac-addresses of both primary and secondary devices, or combination of device IDs of the primary and secondary devices, to name a few. Such operational characteristics may obtained based on the dynamic operation of the two devices 102, 104 when paired and/or may be stored in the primary memory 126 and secondary memory 128. The modification of the watermark signal may be updated periodically based on real-time conditions occurring between the two devices, making for a robust connection, not easily copied by non-approved external devices. Periodic scans by the primary controller communication device 102 enable detection of the modified ultrasonic watermark signal 138 and comparison to pre-authorized watermarks stored in primary memory 126. The original (or parent) ultrasonic watermark signal 136 may be updated based on dynamic communication characteristics between the two devices, such as connectivity time, known between the two devices.

In accordance with some embodiments, the primary controller communication device 102 may further comprise a user interface (UI) 130, such as an interactive display, which presents a user-selectable call option, in response to the watermark no longer being detected by the primary microphone 110. The UI option may provide for re-routing the incoming call to the secondary speaker 120, if desired. In other words, the user selectable call option provides the user with the ability to bypass the automatic routing to the primary speaker, if desired.

Figure 2:
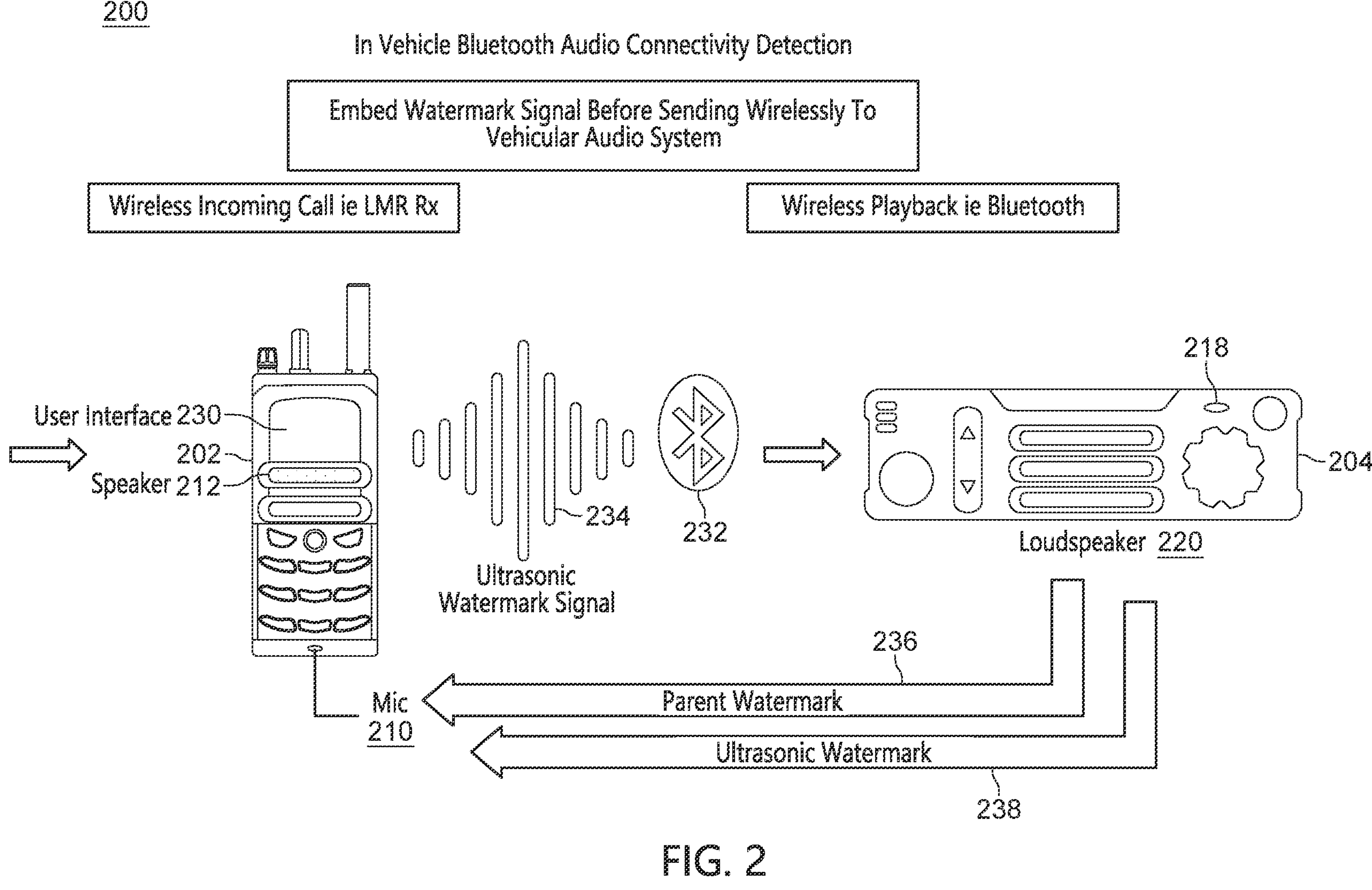
FIG. 2 is an illustration example of the communication system of FIG. 1 formed and operating in accordance with some embodiments.

FIG. 2 is an illustration example of a portable communication system 200 formed and operating in accordance with some embodiments. In this example illustration, the primary controller communication device 102 and secondary responder communication device 104 of FIG. 1 are embodied as a portable radio 202 and vehicular radio 204. Vehicular radio 204 is mounted within a vehicle (not shown). The portable radio 202 includes a primary processor, a primary audio system and transceiver (as shown in FIG. 1). The portable radio 202 includes a portable radio microphone 210 (operating as the primary microphone 110 of FIG. 1), and a portable radio speaker 212 (operating as the primary speaker 112 of FIG. 1). The vehicular radio 204 includes a secondary processor, a secondary audio system, and secondary transceiver (not shown but described in FIG. 1). The vehicular radio 204 includes a vehicular radio microphone 218 (operating as the secondary microphone 118 of FIG. 1) and a vehicular radio speaker 220 (operating as the secondary speaker 120 of FIG. 1). The portable radio 202 and vehicular radio 204 include short-range wireless capability for pairing.

In this example, the portable radio 202 establishes a short-range wireless connection 232 with the vehicular radio 204 using a standard short-range wireless profile, such as BLUETOOTH, NFC, WI-FI, ZIGBEE, to name a few. The portable radio 202 sends an ultrasonic watermark signal 234, over the short-range wireless connection, to the vehicular radio 204. In accordance with some embodiments, the vehicular radio 204 is configured to receive the ultrasonic watermark signal 234 and playback the ultrasonic watermark signal over the vehicular radio speaker 220 as original (parent/non-modified) ultrasonic watermark signal 236. In some embodiments, the ultrasonic watermark signal may be modified based on a predetermined operational characteristic shared between the portable radio and the vehicular radio, as described herein.

In accordance with some embodiments, the portable radio 202 is configured to detect the playback of the ultrasonic watermark signal (modified or non-modified) at the portable radio microphone 210, and route an incoming audio call, in response thereto, over the short-range wireless connection, to playout at the vehicular radio speaker 220 of the vehicular radio 204.

In accordance with some embodiments, the incoming call is automatically re-routed for playout at the portable radio speaker 212 of portable radio 202 in response to the playback of the ultrasonic watermark signal (non-modified signal 236) not being detected by the portable radio microphone 210, while the short-range wireless connection is maintained.

Maintaining the short-range wireless connection beneficially allows the incoming call to be redirected back to the vehicular radio 204 upon re-entry of the portable radio 202 into the vehicle, as the range within which the ultrasonic watermark signal is configured to be smaller than the short-range wireless connection. The range for watermark detection is configured to be a range indicating both devices are within the vehicle. For example, the incoming call may be automatically re-routed back to the vehicular radio 204 in response to re-detecting the playback of the ultrasonic watermark signal (modified or non-modified) by the portable radio microphone 210 of the portable radio 202.

In some embodiments, periodic sending (transmission) of the ultrasonic watermark signal 234 and playback of the non-modified watermark signal 236 may be used to maintain the call routing to the vehicular radio 204 for playout at vehicular radio speaker 220.

In some embodiments, the system may be configured for additional security in which the playback of the original/parent ultrasonic watermark signal 236 is modified based on a predetermined operational characteristic shared between the portable radio and the vehicular radio, prior to playback over the vehicular radio speaker 220 for detection by the portable radio microphone 210. Generation of a modified (child) ultrasonic watermark signal 238 may be configured by the vehicular radio 204. For example, in some embodiments, the original/parent ultrasonic watermark signal 236 may be modified by the vehicular radio processor, based on a predetermined operational characteristic associated with the short-range wireless communication such as connectivity time-lapse. The processing of portable radio 202 and vehicular radio 204 may include a counter which tracks connectivity time and modifies the original (or parent, non-modified) watermark signal based on the connectivity characteristic. Since the connectivity time-lapse is a real-time parameter, it is less easily copied by external non-approved devices.

The portable radio 202 is configured to compare the played back modified (child) ultrasonic watermark signal 238 to current time-lapse connection and variation associated with that time-laps stored in a memory of the portable radio (i.e. primary memory 126 of FIG. 1). If matched, then audio routing to the vehicular radio 204 is maintained. If not matched (or not matched entirely), then the audio routing is automatically re-routed to the portable radio 202, while the wireless connection is maintained. The wireless connection is maintained while the portable radio 202 and vehicular radio 204 remain within the short-range connectivity range. Again, the range for the watermark signal is configured to be smaller than the connection range for wireless connectivity.

Maintaining the wireless connection, facilitates the ability to automatically re-route the incoming call back to the vehicular radio 204 in response to re-detecting the playback of the variation of the ultrasonic watermark signal 238 by the portable radio microphone of the portable radio.

The portable radio 202 may further comprise a user interface (UI) 230, such as an interactive display, which presents user-selectable options, in response to the watermark (non-modified or modified) no longer being detected by the portable radio microphone 210. The UI option allows for re-routing the incoming call to the vehicular radio speaker 220, if desired. In other words, the user selectable option provides the user with the ability to bypass the automatic re-routing to the primary speaker, if desired. This option allows the call to be redirected back to play out, for example, at the vehicle radio speaker even though the user is no longer in the vehicle.

The predetermined operational characteristic of the watermark signal is preferably known only by the primary controller communication device and the secondary responder communication device. Handover of watermarking to the vehicular radio 204 allows for a variety of modifications to be made that are known only to the portable radio 202 and vehicular radio 204. For example, the parent watermark ultrasonic signal 236 may be modified based on the predetermined operational characteristic of connectivity time-lapse (i.e. the amount of elapsed time the two devices have been wirelessly connected). The time-lapse characteristic may be used to modify the ultrasonic watermark signal by incrementally adding a predetermined frequency, over a predetermined time interval. For example, an additional 100 Hz frequency may be added to the ultrasonic frequency, for every 10 seconds of elapsed connectivity from the moment of connection up to some predetermined maximum, for example one minute. A counter associated with the processors can then reset and repeat. For this example, the vehicular radio 204 may apply an additional 100 Hz to the original/parent ultrasonic watermark signal 236 for every 10-seconds of connectivity lapse-time to generate a modified (child) ultrasonic watermark signal 238 for playback from the vehicular radio speaker 220. The portable radio 202, knowing the connection time-lapse, acknowledges modified ultrasonic watermark signal 238 and that the audible connection to the vehicular radio 204 is still sufficient for the audio connection to be maintained. The above example may be shown as a function of time:

$$d(f)=100t$$

where 100 represents the frequency (100 Hz) to add to the original/parent watermark signal at predetermined t-intervals of time, such as a 10-second time-lapse interval. The Table 1 below shows an example of frequency added to the original watermark signal over five time-lapse intervals:

TABLE 1

| Connection Time Lapse (s) | Frequency to Add (Hz) |
|---|---|
| $1^{st}$ | 100 |
| 2nd | 200 |
| 3rd | 300 |
| 4th | 400 |
| 5th | 500 |

The above Table 1 would be known by both devices, 202 204, such as by being stored in respective memories of the devices. In this example configuration, for every 10-seconds of connectivity, the system adds an additional 100 Hz to the ultrasonic watermark signal. The following Table 2 provides an example of the additional 200 Hz frequency (from Table 1) being added during the second time-lapse of ultrasonic signal transmission.

TABLE 2

| Original/Parent Watermark Frequency (transmission time) | | | Time Lapse | Modified/Child Watermark Frequency (transmission time) | | |
|---|---|---|---|---|---|---|
| 17000 Hz (80 ms) | 19500 Hz (20 ms) | 17000 H (80 ms)z | $2^{nd}$ 10 s | 17200 Hz (80 ms) | 19700 Hz (20 ms) | 17200 Hz (80 ms) |

Modifying the original/parent ultrasonic signal provides for modified (child) ultrasonic signals which are only known to the portable radio 202 and vehicular radio 204, which advantageously avoids detectability by non-approved devices, which in turn provides increased security against eavesdropping and/or call sabotage.

Figure 3:
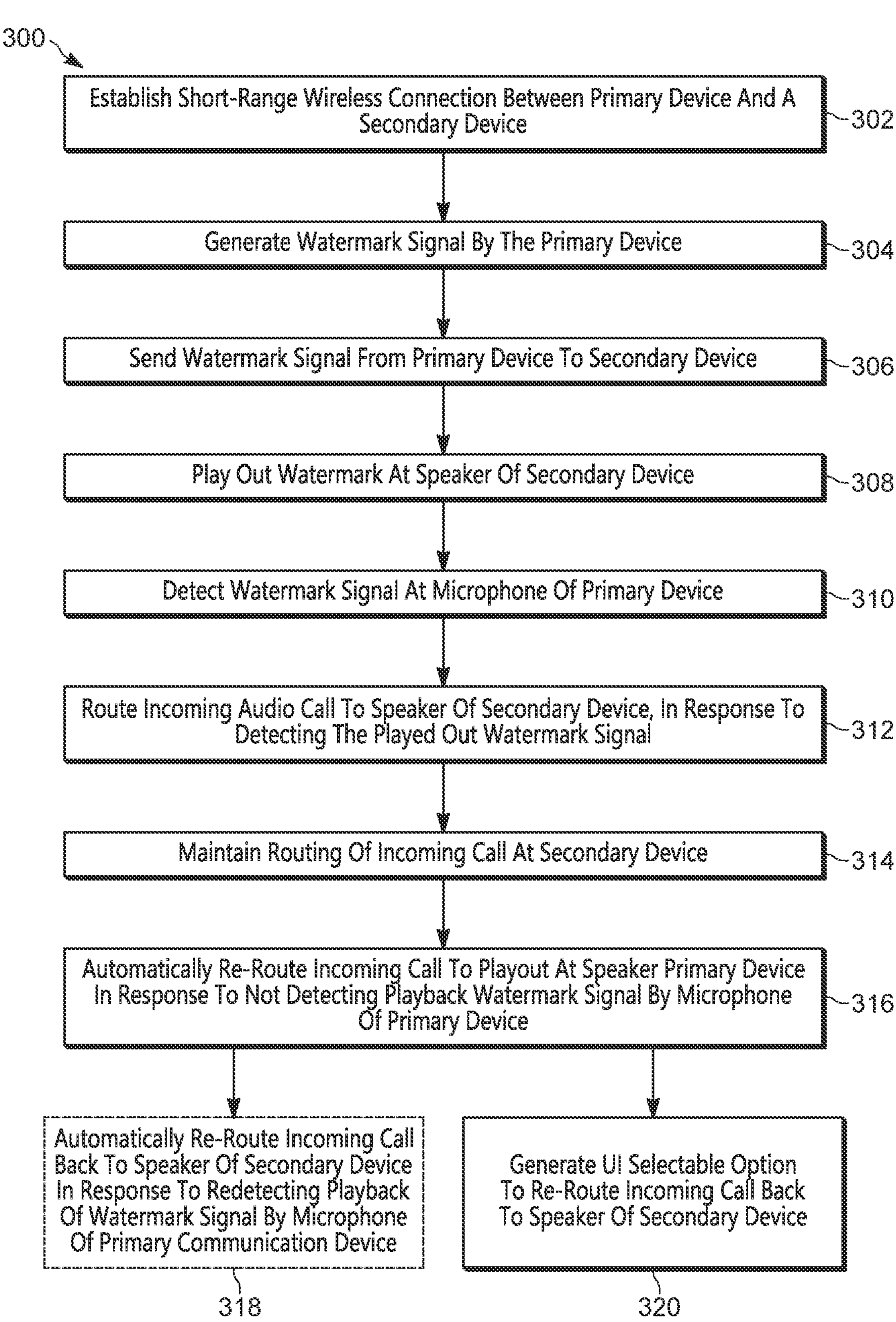
FIG. 3 is a flowchart of a method for detecting audio connectivity and managing call routing in accordance with some embodiments.

Methods are also provided herein which describe the application of watermark and/or watermark variations for detecting and automatically managing audio connectivity in accordance with some embodiments FIG. 3 is a flowchart of a method 300 for detecting and managing audio connectivity in accordance with some embodiments. Method 300 begins at 302 with establishing a standard short-range wireless connection between a primary controller communication device and a secondary responder communication device, such as those previously described in FIG. 1. In accordance with the embodiments, the method includes generating a watermark signal by the primary controller communication device at 304, and sending the watermark signal from the primary controller communication device to the secondary responder communication device at 306. As mentioned previously, the ultrasonic watermark signal may be embedded within an audio call or sent (transmitted) independently of the audio call. The method 300 continues at 308 with playing out the ultrasonic watermark signal at a speaker of the secondary responder communication device and detecting the watermark signal at a microphone of the primary controller communication device at 310.

The method continues to 312 with routing an incoming audio call to the speaker of the secondary responder communication device, in response to detecting the played out watermark signal. If the ultrasonic watermark signal was already embedded into an incoming call, then that incoming call will be routed to the speaker of the secondary responder communication device. The routing of the incoming call is maintained at the secondary device 314. The method may be configured for a single ultrasonic watermark transmission, periodic ultrasonic watermark transmission or continuous ultrasonic watermark transmission for playout at the secondary speaker of the secondary responder communication device and detection by the microphone of the primary controller communication device to maintain the routing of the incoming call at the speaker of the secondary responder communication device.

In accordance with some embodiments, the method proceeds to 316 with automatically re-routing the incoming call for playout at the speaker of the primary controlling communication device in response to the playback of the ultrasonic watermark signal not being detected by the microphone of the primary communication device, while the short-range connection is maintained. The ultrasonic watermark signal, as mentioned previously, is configured to be detectable within a predetermined watermark detection range, wherein that predetermined watermark detection range is smaller (shorter distance) than the short-range wireless connectivity range. The ultrasonic watermark signal will not be detected when the primary communication device separates from the secondary communication device beyond that predetermined watermark detection range, and as a result, the incoming call will be rerouted to the microphone of the primary communication device.

At 318, the incoming call may be automatically rerouted back to the speaker of the secondary device in response to re-detecting playback of the watermark signal at the microphone of the primary device. The incoming call will be redirected back to the speaker of the secondary device when the devices come within the predetermined distance of each other. For example, user of primary controller communication device (e.g. portable radio 202 of FIG. 2) re-entering vehicle (proximity to vehicle radio 204).

To summarize, the communication devices of the system and method are configured so that a call plays out at the vehicle radio speaker when both devices are inside of the vehicle (watermark detected). The call is then re-routed to the exited device when one of the devices exits the vehicle (watermark no longer detected). If the exited device re-enters the vehicle, the call is then redirected back to the vehicle radio.

In some embodiments, while the incoming call is being played out at the speaker of the primary device at 316, the primary communication device may further generate a user interface selectable option to re-route the incoming call back to the speaker of the secondary device at 320. This option allows the call to be redirected back to play out, for example, at a vehicle radio speaker even though the user portable device is no longer in the vehicle. This option provides the user with the ability to bypass the re-route, for example if the user wants to exit the vehicle briefly with the intent to quickly, re-renter.

Figure 4:
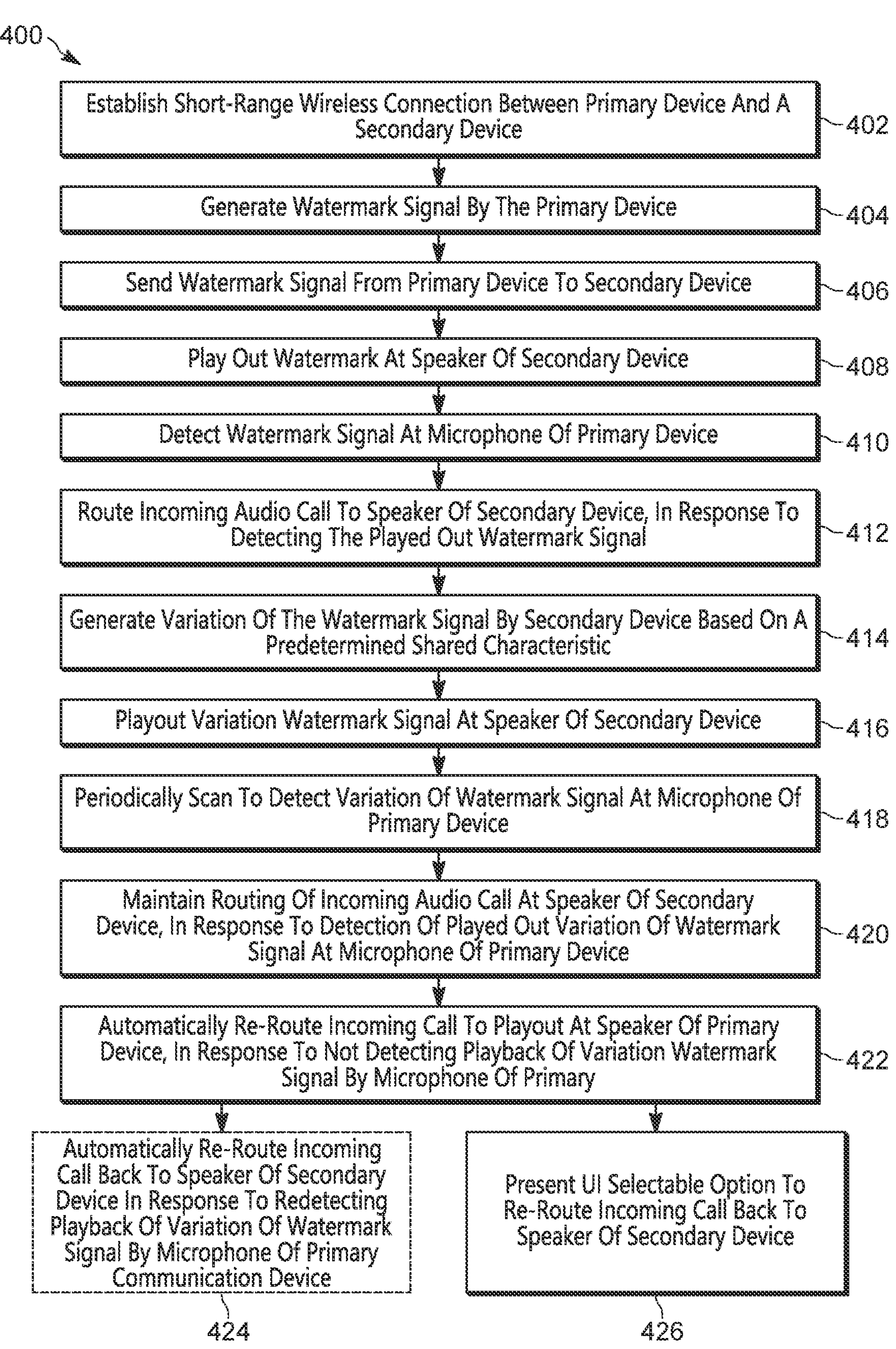
FIG. 4 is a flowchart of the method FIG. 3 enhanced with increased security in accordance with some embodiments.

FIG. 4 is a flowchart of a method for detecting audio connectivity in accordance with some embodiments. This embodiment will further include using a watermark modification based on a predetermined operational characteristic known only to the two connected devices, thereby providing for a more secure connection. Method 400 begins similarly to method 300 with establishing a standard short-range wireless connection between a primary controller communication device and a secondary responder communication device at 402, generating a watermark signal by the primary controller communication device at 404, and sending the watermark signal from the primary controller communication device to the secondary responder communication device at 406. As mentioned previously, the ultrasonic watermark signal may be embedded within an audio call or sent (transmitted) independently of the audio call. The method 400 continues at 408 with playing out the ultrasonic watermark signal at a speaker of the secondary responder communication device, and detecting the watermark signal at a microphone of the primary controller communication device at 410. The method continues to 412 with routing an incoming audio call to the speaker of the secondary responder communication device, in response to detecting the played out watermark signal at the microphone of the primary controller communication device.

In accordance with this additional embodiment, the method includes at 414 generating a variation of the ultrasonic watermark signal by the secondary responder communication device, wherein the variation of the ultrasonic watermark signal is based on a predetermined operational characteristic shared between the primary controller communication device and the secondary responder communication device. For example, the variation of the ultrasonic watermark signal may be varied based on connectivity lapse time, as previously described.

The method 400 proceeds to 416 with playing out the variation of the ultrasonic watermark signal at the speaker of the secondary responder communication device. The method 400 includes at 418 periodically scanning, by the primary communication device, to detect the variation of the ultrasonic watermark signal at the microphone of the primary device, and at 420 maintaining the routing of the incoming audio call to the speaker of the secondary responder communication device, in response to detecting the played out variation of the ultrasonic watermark signal at the microphone of the primary controller communication device. The variation of the watermark signal (414) may also be varied over time throughout a call, for example based on current connectivity time known to both devices. The periodic scanning, by the primary device, detects updated variations of the watermark signal and compares such updates to acceptable variations known or pre-stored at the primary device.

The incoming audio call remains routed to the speaker of the secondary responder communication device at 420 until the variation of the watermark signal is no longer detected. The lack of watermark detection may result from, for example, a user operating a portable primary device (e.g. portable radio) moving away from a stationary secondary device (e.g. a vehicle radio, or other portable device left behind), where the distance between the devices is sufficient to maintain the short-range wireless connection but insufficient to maintain the watermark signal.

The method proceeds to 422 by automatically re-routing the incoming call for playout at the speaker of the primary controlling communication device in response to the playback of the variation of the ultrasonic watermark signal not being detected by the microphone of the primary communication device, while the short-range connection is maintained. This call re-routing allows a user to beneficially continue the call at their portable device, for example, when the user steps away from the secondary device (vehicle or other).

The call remains re-routed to the primary device at 422, until re-detection of a watermark signal takes place again (indicating that the two devices are back within the predetermined proximity). For example, watermark re-detection takes place when the portable radio returns to vehicle having the vehicle radio, or the portable returns back within proximity of a secondary device that was left behind. At this stage, the system may be pre-configured to generate the watermark signal at the secondary device (for re-detection by the primary microphone). In response to such re-detection, the method provides for automatically re-routing the incoming call back to the secondary communication device. For example, the method at 424 provides for automatically re-routing the incoming call back to the secondary communication device in response to re-detecting the playback of the variation of the ultrasonic watermark signal by the microphone of the primary communication device.

In some embodiments, the method 400 may further provide for presenting a user selectable call option at a user interface (UI) of the primary controller communication device, during the automatic re-routing and playout of the incoming call at the speaker of the primary communication device (at 422) and while the watermark is not being detected, the user-selectable option comprising: a user-selectable option to re-route the incoming call back to the speaker of the secondary responder communication device. This user-selectable option allows a user to negate the automatic re-route of the call to the primary device, if desired.

The method 300, 400 may advantageously be applied to two communication devices configured for short-range connectivity as previously described. Examples of such devices, may include, but are not limited to: portable radio with wireless connectivity to RSM, portable radio with wireless connectivity to vehicular radio, as well as other wirelessly paired devices having respective speaker and microphone. Generation of the ultrasonic watermark signal (modified or non-modified) by one device being transmitted over the short-range connection for playback at a speaker of the other device enables detection (or non-detection) indicative of device proximity for managing the routing of an incoming call. For example, the primary controller communication device may be a portable radio device and the secondary responder communication device may be a remote speaker microphone (RSM) device or a vehicular radio. The playback of ultrasonic watermark signal being detected by the microphone of the portable radio is indicative of the portable radio device being within a predetermined distance of the RSM (or predetermined distance of the vehicular radio), thereby routing an incoming call to the RSM (or to the vehicular radio). The playback of ultrasonic watermark signal not being detected by the microphone of the portable radio is indicative of the portable radio device being outside of the predetermined distance for the two devices, causing a re-route of the call to the portable radio. Dynamic adjustment to the ultrasonic watermark detection range can also be made based on learned usage patterns and contextual environment, for example a first ultrasonic watermark detection range for a portable radio/RSM environment and a second ultrasonic watermark detection range for a portable radio/vehicular radio environment.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with the generation of ultrasonic watermark signals and the detection of those signals for controlling audio routing between two communication devices In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A communication system, comprising:

a primary controller communication device comprising a primary processor, a primary audio system, a primary microphone, and a primary speaker;

a secondary responder communication device comprising, a secondary processor, a secondary audio system, a secondary microphone, and a secondary speaker;

the primary processor being configured to:

establish a short-range wireless connection with the secondary processor using a standard short-range wireless profile; and send an ultrasonic watermark signal, over the short-range wireless connection, from the primary audio system to the secondary audio system;

the secondary processor being configured to:

receive the ultrasonic watermark signal at the secondary audio system; and playback the ultrasonic watermark signal over the secondary speaker;

wherein the primary processor is further configured to:

detect the playback of the ultrasonic watermark signal at the primary microphone; and route an incoming audio call, over the short-range wireless connection, to playout at the secondary speaker of the secondary responder communication device, in response to the playback of the ultrasonic watermark signal being detected at the primary microphone; and automatically re-route the incoming call for playout at the primary speaker in response to the playback of the ultrasonic watermark signal not being detected by the primary microphone, while the short-range wireless connection is maintained; and wherein the primary processor is further configured to monitor for periodic detection of the playback of the ultrasonic watermark signal at the primary microphone to maintain the routing of the incoming call to the secondary speaker of the secondary responder communication device; and apply a non-standard short-range wireless profile associated with the primary controller device, the non-standard short-range wireless profile controlling re-route of the incoming call to the primary controller device while the short-range wireless connection to the secondary responder device remains connected.

2. The communication system of claim 1, wherein the primary processor is further configured to:

automatically re-route the incoming call back to the secondary responding communication device in response to re-detecting the playback of the ultrasonic watermark signal by the microphone of the primary communication device.

3. The communication system of claim 1, wherein the detect the playback of the ultrasonic watermark signal at the primary microphone is indicative of the primary controller communication device being within a predetermined distance of the secondary responder communication device.

4. The communication system of claim 1, wherein the secondary processor is further configured to:

modify the ultrasonic watermark signal, based on a predetermined operational characteristic of the short-range wireless connection, prior to playback over the secondary speaker as a modified ultrasonic watermark signal for detection by the primary microphone.

5. The communication system of claim 4, wherein the predetermined operational characteristic is known only by the primary controller communication device and the secondary responder communication device.

6. The communication system of claim 5, wherein the predetermined operational characteristic is a communication connectivity characteristic known only by the primary controller communication device and the secondary responder communication device.

7. The communication system of claim 1, wherein the primary controller communication device is a portable radio having short-range wireless capability, and the secondary responder communication device is a vehicular radio having short-range wireless capability.

8. The communication system of claim 1, wherein the primary controller communication device is a portable radio device having short-range wireless capability, and the secondary responder communication device is a wireless remote speaker microphone (RSM) having short-range wireless capability.

9. A method, comprising:

establishing a standard short-range wireless connection between a primary controller communication device and a secondary responder communication device;

generating an ultrasonic watermark signal by the primary controller communication device;

sending the ultrasonic watermark signal from the primary controller communication device to the secondary responder communication device;

playing out the ultrasonic watermark signal at a speaker of the secondary responder communication device;

detecting the ultrasonic watermark signal at a microphone of the primary controller communication device;

routing an incoming audio call to the speaker of the secondary responder communication device, in response to detecting the played out watermark signal;

generating a variation of the ultrasonic watermark signal by the secondary responder communication device, wherein the variation of the ultrasonic watermark signal is based on a predetermined operational characteristic shared between the primary controller communication device and the secondary responder communication device;

playing out the variation of the ultrasonic watermark signal at the speaker of the secondary responder communication device;

periodically scanning to detect the variation of the ultrasonic watermark signal at the microphone of the primary controller communication device;

maintaining the routing of the incoming audio call to the speaker of the secondary responder communication device, in response to detecting the played out variation of the ultrasonic watermark signal at the microphone of the primary controller communication device; and automatically re-routing the incoming call for playout at the speaker of the primary controlling communication device in response to the played out variation of the ultrasonic watermark signal not being detected by the microphone of the primary communication device, while the short-range connection is maintained.

10. The method of claim 9, further comprising:

automatically re-routing the incoming call back to the secondary responding communication device in response to re-detecting the played out variation of the ultrasonic watermark signal by the microphone of the primary communication device.

11. The method of claim 9, further comprising:

presenting a user selectable call option at a user interface (UI) of the primary controller communication device to re-route the incoming call back to the speaker of the secondary responder communication device, wherein the UI selectable call option is presented during the automatic re-routing and playout of the incoming call at the speaker of the primary communication device and while the watermark is not being detected.

12. The method of claim 9, wherein detecting the watermark signal at a microphone of the primary controller communication device is indicative of the primary controller communication device being within a predetermined distance of the secondary responder communication device.

13. The method of claim 9, wherein the predetermined operational characteristic of the watermark signal is known only by the primary controller communication device and the secondary responder communication device.

14. The method of claim 12, wherein the predetermined operational characteristic is a connectivity characteristic shared between the primary controller communication device and the secondary responder communication device.

15. The method of claim 13, wherein the predetermined operational characteristic of the watermark signal is based on a connectivity time-lapse established between the primary controller communication device and the secondary responder communication device.

16. The method of claim 9, wherein the variation of the ultrasonic watermark signal is updated over a predetermined time interval by the secondary responder communication device for detection by the primary controller communication device.

17. The method of claim 9, wherein the primary controller communication device is a portable radio, and the secondary responder communication device is a vehicular radio.

18. The method of claim 9, wherein the primary controller communication device is a portable radio, and the secondary responder communication device is a remote speaker microphone (RSM).

19. A communication system, comprising:

a primary controller communication device comprising a primary processor, a primary audio system, a primary microphone, and a primary speaker;

a secondary responder communication device comprising, a secondary processor, a secondary audio system, a secondary microphone, and a secondary speaker;

the primary processor being configured to:

establish a short-range wireless connection with the secondary processor using a standard short-range wireless profile; and send an ultrasonic watermark signal, over the short-range wireless connection, from the primary audio system to the secondary audio system;

the secondary processor being configured to:

receive the ultrasonic watermark signal at the secondary audio system; and playback the ultrasonic watermark signal over the secondary speaker;

wherein the primary processor is further configured to:

detect the playback of the ultrasonic watermark signal at the primary microphone; and route an incoming audio call, over the short-range wireless connection, to playout at the secondary speaker of the secondary responder communication device, in response to the playback of the ultrasonic watermark signal being detected at the primary microphone; and automatically re-route the incoming call for playout at the primary speaker in response to the playback of the ultrasonic watermark signal not being detected by the primary microphone, while the short-range wireless connection is maintained; and wherein the primary controller communication device further comprises:

a user interface (UI), the UI presenting a user-selectable option comprising:

a user-selectable option to re-route the incoming call back to the secondary speaker of the secondary responder communication device, wherein the user-selectable option is presented during the automatic re-routing and playout of the incoming call at the speaker of the primary communication device while the watermark is not being detected.

20. A communication system, comprising:

a primary controller communication device comprising a primary processor, a primary audio system, a primary microphone, and a primary speaker;

a secondary responder communication device comprising, a secondary processor, a secondary audio system, a secondary microphone, and a secondary speaker;

the primary processor being configured to:

establish a short-range wireless connection with the secondary processor using a standard short-range wireless profile; and send an ultrasonic watermark signal, over the short-range wireless connection, from the primary audio system to the secondary audio system;

the secondary processor being configured to:

receive the ultrasonic watermark signal at the secondary audio system;

generate a variation of the ultrasonic watermark signal by the secondary responder communication device, wherein the variation of the ultrasonic watermark signal is based on a predetermined operational characteristic shared between the primary controller communication device and the secondary responder communication device and playback the variation of the ultrasonic watermark signal over the secondary speaker;

wherein the primary processor is further configured to:

periodically scan to detect the playback of the variation of the ultrasonic watermark signal at the primary microphone; and route an incoming audio call, over the short-range wireless connection, to playout at the secondary speaker of the secondary responder communication device, in response to the playback of the variation of the ultrasonic watermark signal being detected at the primary microphone; and automatically re-route the incoming call for playout at the primary speaker in response to the playback of the variation of the ultrasonic watermark signal not being detected by the primary microphone, while the short-range wireless connection is maintained.

* * * * *